J. MESICK.
DIRIGIBLE HEADLIGHT.
APPLICATION FILED NOV. 10, 1916.
1,231,184.
Patented June 26, 1917.
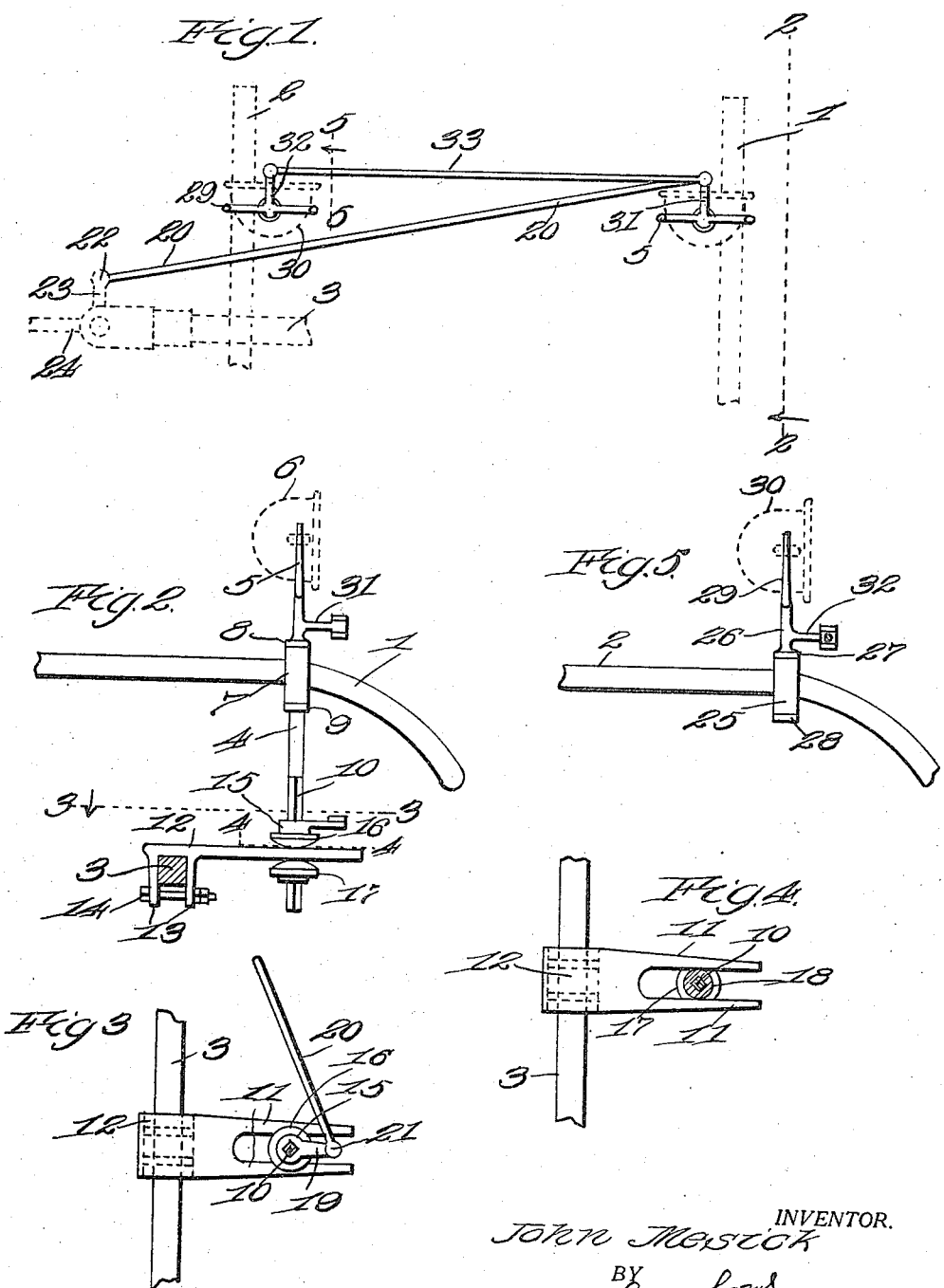
INVENTOR.
John Mesick
BY
Carl M. Crawford
ATTORNEY

UNITED STATES PATENT OFFICE.

JOHN MESICK, OF SPOKANE, WASHINGTON.

DIRIGIBLE HEADLIGHT.

1,231,184.    Specification of Letters Patent.    Patented June 26, 1917.

Application filed November 10, 1916. Serial No. 130,654.

*To all whom it may concern:*

Be it known that I, JOHN MESICK, a citizen of the United States, residing at Spokane, in the county of Spokane and State of Washington, have invented new and useful Improvements in Dirigible Headlights, of which the following is a specification.

This invention relates to improvements in dirigible headlights for automobiles.

Because of the fact that a spring mounted body has a gyratory movement relatively to its running gear, a problem has always been presented in designing a dirigible mechanism by reason of the fact that that portion of the mechanism which is actuated, namely, the lamp spindle, is mounted upon the body, whereas actuation of such spindle is effected by the steering knuckle, which is a part of the running gear. With these requirements present, it has been found difficult to design a practical mechanism of a simple nature whereby synchronic movement could be transmitted from the knuckle to the lamp supporting spindle without the employment of springs and in such a manner that positive actuation could be obtained.

In accordance with my invention, the lamp supporting spindle is mounted upon the body to turn about a fixed axis and in such a manner as to prevent longitudinal movement of said spindle. A support is provided on the running gear for a crank hub which is slidably but non-rotatively connected with the spindle and also slidably and rotatively connected with the support thereby providing for relative vertical movement of the spindle with respect to the crank hub, to compensate for relative vertical movement of the body with respect to the running gear, the slidable connection of the crank hub with its support, providing for relative horizontal movement of the body with respect to the running gear, this structure always affording a positive connection between the crank hub and the lamp supporting spindle.

My invention also includes a companion lamp supporting spindle mounted upon the body and connected with the main supporting spindle in such a manner that the spindles will be actuated in unison.

My invention has other features and objects which will be more fully described in connection with the accompanying drawing and which will be more particularly pointed out in and by the appended claims.

In the drawing:—

Figure 1 is a plan view of one form of the device of my invention showing its application to body portions and the running gear of an automobile, the latter being shown in dotted lines.

Fig. 2 is a sectional view on line 2—2 of Fig. 1.

Fig. 3 is a sectional view on line 3—3 of Fig. 2.

Fig. 4 is a sectional view on line 4—4 of Fig. 2.

Fig. 5 is a sectional view on line 5—5 of Fig. 1.

Like characters of reference designate similar parts throughout the different figures of the drawing.

I have not shown the device of my invention applied to any particular type of automobile because it is a feature of my invention to provide a structure adapted for use in connection with any type of automobile.

As illustrated, 1 and 2 designate rigid arms or body portions adapted for connection with the supporting springs, not shown, which are usually mounted upon the axle 3. It is a well known fact that while an automobile is running, the body portion and the running gear not only partake of relative vertical movement but the body also has a relative longitudinal movement with respect to the running gear, this up and down and forward and backward movement of the body being greatly in excess of lateral movement. This variable movement of the body and running gear must be taken into consideration in a device of this character in case springs are avoided and jointed parts reduced to a minimum.

In the development of my novel structure I employ a primary lamp supporting spindle, designated at 4 and which is provided with a forked upper end 5 to support a lamp 6. A sleeve 7 is bracketed rigidly on body portion 1 and the spindle 4 is journaled in the sleeve 7 to rotate about a fixed vertical axis with respect to body portion 1. Spindle 4 is provided with a supporting flange 8 which rests upon the top of sleeve 7 and a collar 9, fixed on spindle 4, engages the lower end of sleeve 7. Thus it will be seen that spindle 4 is not only held to an axis of rotation which is fixed with respect to body portion 1 but it is also held against longitudinal movement. I contemplate fitting the spindle 4 in the sleeve 7 very loosely for a purpose which will hereinafter more fully appear. The lower end portion of the spindle 4 is preferably polygonal in cross section, as indicated at 10.

On a part of the running gear, preferably the axle 3, is rigidly mounted a crank hub support which is shown in the form of an open ended fork comprising fork portions 11 and a bracket portion 12, the latter being jawed as indicated at 13 so as to permit of its being bolted by bolts 14, in rigid connection with the axle 3. This supporting fork extends horizontally forwardly of the axle and the polygonal portion 10 is of sufficient length to extend downwardly through the fork. A crank hub 15 is provided with a bore shaped to fit the polygonal portion 10 so as to be slidable thereon but non-rotatively connected therewith. Said crank hub is provided with upper and lower flanges 16 and 17 adapted to overhang upper and lower portions of the fork support in such a manner that while the crank hub will be longitudinally slidable in the fork support it cannot move up and down with respect thereto. That portion of the crank hub between the fork portion 11 is cylindrical, as indicated at 18, so that the crank hub may also rotate or oscillate in the fork about the axis of the spindle 4. This longitudinal movement of the crank hub in the fork compensates for relative horizontal forward and backward movement of the body with respect to the running gear. In order to compensate for lateral movement of the body with respect to the running gear and also the rocking or tilting of the axle with respect to the body, I preferably make the flanges 16 and 17 semi-spherical, as clearly shown in Fig. 2. This construction, together with the loose fit of the spindle in the sleeve 7 will permit of the utmost freedom of movement of the body with respect to the running gear without in any way disturbing or causing the device of my invention to bind and thereby resist freedom of action.

The crank hub 15 is provided with a crank 19 and an operating rod 20 is loosely pivoted to the crank 19 at 21, at one end of said rod. The remaining end of said rod 20 is pivotally connected at 22 to a crank 23 projecting forwardly from the knuckle 24 in such a manner as to cause the spindle 4 to turn in synchronism with the steering wheels. In many instances, one dirigible light or lamp may be deemed sufficient but in the event it is desired to have both lamps dirigible I have made provision accordingly.

On body portion 2 is mounted a supporting sleeve 25 in which a companion lamp supporting spindle 26, is journaled, to rotate about an axis fixed with respect to the body. Spindle 26 is provided with a supporting flange 27 which rests upon the top of sleeve 25, and a collar 28 coacts with flange 27 to hold the spindle 26 against longitudinal movement. Spindle 26 is equipped with a lamp supporting fork 29 in which a lamp 30 may be mounted. Spindles 4 and 26 are provided with crank arms 31 and 32 which are pivotally connected to a rod 33 whereby the companion lamp will be caused to turn in unison with lamp 6.

The novel structure of my invention not only entirely eliminates springs but it also provides for positive actuation and therefore renders the device more accurately responsive. Application of the device of my invention does not necessitate extensive alteration of the car but merely requires the substitution of special lamp spindles which can in most every case be journaled in the sleeves now employed.

The application of my improved fork support to the axle does not weaken the latter, and in assembling the device the open ended fork permits of insertion of the crank hub very easily.

It is believed that the novelty and utility of my invention will be fully understood from the foregoing description and while I have herein shown and described one specific form of my invention I do not wish to be limited thereto except for such limitations as the claims may import.

I claim:—

1. A dirigible headlight for automobiles comprising in combination, a lamp supporting spindle, means for supporting said spindle against longitudinal movement and rotatively mounting said spindle from a portion of the body of the automobile to permit of rotation of said spindle about a vertical axis fixed with respect to said body, a supporting means fixed to a portion of the running gear, a crank hub vertically slidable with respect to and non-rotatively connected with said spindle and said crank hub being rotatable and horizontally slidably mounted on said supporting means and held thereby against vertical movement with respect thereto, and means for causing said hub to turn synchronously with the steering wheels, substantially as described.

2. A dirigible headlight for automobiles comprising in combination, a lamp supporting spindle provided with a lower polygonal portion, a sleeve means engaging the upper portion of said spindle and supporting the latter for rotation about a vertical axis and against longitudinal movement, a horizontally disposed fork fixed to the axle of the automobile, a crank hub rotatable in said fork and having upper and lower flanges holding said crank hub against vertical movement but permitting horizontal sliding movement of said crank hub along said fork, the polygonal portion of said spindle extending through and being vertically slidable in said crank hub thereby compensating for relative movement of the body with respect to the axle both horizontally and vertically and always maintaining a positive connection between the spindle and said hub, and means for causing said hub to turn synchronously with the steering wheels, substantially as described.

3. A dirigible headlight for automobiles comprising in combination, a lamp supporting spindle, means for supporting said spindle against longitudinal movement and rotatively mounting said spindle from a portion of the body of the automobile to permit of rotation of said spindle about a vertical axis fixed with respect to said body, a supporting means fixed to a portion of the running gear, a crank hub vertically slidable with respect to and non-rotatively connected with said spindle and said crank hub being rotatably and horizontally slidably mounted on said supporting means and held thereby against vertical movement with respect thereto, means for causing said hub to turn synchronously with the steering wheels, a companion lamp supporting spindle mounted to turn about a fixed axis with respect to the body, and means connecting said spindles to cause the same to turn in unison, substantially as described.

4. A dirigible headlight for automobiles comprising in combination, a lamp supporting spindle provided with a lower polygonal portion, a sleeve means engaging the upper portion of said spindle and supporting the latter for rotation about a vertical axis and against longitudinal movement, a horizontally disposed fork secured to the axle of the automobile, a crank hub rotatable in said fork and having upper and lower flanges holding said crank hub against vertical movement but permitting horizontal sliding movement of said crank hub along said fork, the polygonal portion of said spindle extending through and being vertically slidable in said crank hub thereby compensating for relative movement of the body with respect to the axle both horizontally and vertically and always maintaining a positive connection between the spindle and said hub, means for causing said hub to turn synchronously with the steering wheels, a companion lamp supporting spindle mounted to turn about a fixed axis with respect to the body, and means connecting said spindles to cause the same to turn in unison, substantially as described.

5. In a dirigible light for automobiles, a fork support, a crank hub rotatably mounted in said fork and having rounded flanges engaging the fork above and below the same to maintain said hub loosely in engagement with said fork, means engaging said crank hub to turn the same with the steering wheels, and a dirigible lamp in operating connection with said hub, substantially as described.

In testimony whereof I claim the foregoing as my own, I hereby affix my signature.

JOHN MESICK.

Copies of this patent may be obtained for five cents each, by addressing the "Commissioner of Patents, Washington, D. C."